United States Patent [19]

Meditz et al.

[11] 4,051,790
[45] Oct. 4, 1977

[54] VEHICLE SAFE

[76] Inventors: William F. Meditz, 6821 E. Thornapple Drive, Mayfield Village, Ohio 44040; James V. Congin, 5717 Wilson Mills Road, Highland Heights, Ohio 44143

[21] Appl. No.: 688,412

[22] Filed: May 20, 1976

[51] Int. Cl.² .............................................. E05G 1/00
[52] U.S. Cl. ......................................... 109/58; 70/63; 70/DIG. 57; 109/52
[58] Field of Search .................. 70/63, 166, 167, 168, 70/170, 171, 172, 230, 232, 395, 427, DIG. 57; 109/50

[56] References Cited

U.S. PATENT DOCUMENTS

| | | | |
|---|---|---|---|
| 1,400,908 | 12/1921 | Prince | 70/168 |
| 3,784,727 | 1/1974 | Haubein | 70/DIG. 57 |
| 3,863,999 | 2/1975 | Muller | 70/167 X |

Primary Examiner—Casmir A. Nunberg
Assistant Examiner—David H. Corbin
Attorney, Agent, or Firm—Daniel G. Blackhurst

[57] ABSTRACT

A safe box for deposit of money or other valuables to prevent theft of same includes separable parts releasably locked together by first and second locking means respectively having key operated first and second release means. The first release means is positioned between the parts and is accessible through a limited access opening in one of the parts. The second locking means has a blocking member which blocks access to the first release means through the limited access opening and also holds the first locking means in a locked position until the second release means is operated to unlock the second locking means.

6 Claims, 5 Drawing Figures

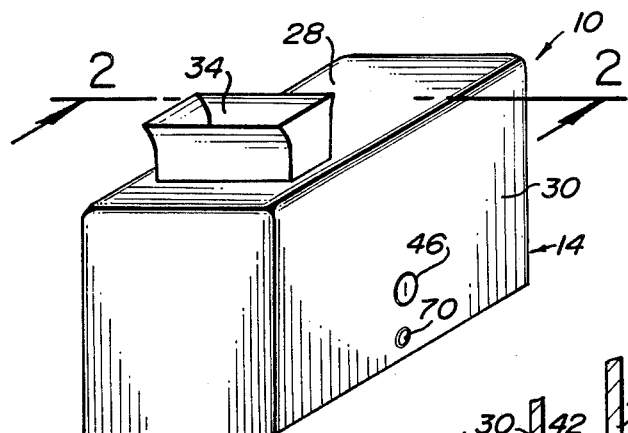

VEHICLE SAFE

BACKGROUND OF THE INVENTION

The subject invention is directed toward the art of safe boxes for storage of money or other valuables to prevent theft of same and, more particularly, to safe boxes of the type mounted in the cab of a vehicle for use by the vehicle operator to deposit money collected from deliveries.

The invention will be described with respect to a certain preferred embodiment; however, as will become apparent, the invention can be embodied in many forms of safe boxes and enclosure structures.

It is known to have safe boxes of the type which can be opened only by the use of a key in the form of a special tool. After boxes of this type have been in use for some time, professional thieves may obtain the special tool required to open the box. It would be desirable to have a safe box which would be extremely difficult and time-consuming to open even by a professional thief having some special tools.

Safe boxes or the like having a plurality of locking devices must be of special construction and the locks normally do not cooperate with one another in such a manner that sequential opening of the locking devices in a certain order is required for gaining access to the safe box. Locks which function completely independently of one another are of little benefit as a way to modify an existing single lock safe box having a lock which can be opened by some professional thieves having a special tool.

SUMMARY OF THE INVENTION

A safe box or the like includes separable parts releasably locked together by first and second locking means respectively having first and second key operated release means. The first release means is located between the parts for access through a limited access opening in one of the parts. The second locking means includes a blocking member which holds the first locking means against release and prevent access to the first release means through the limited access opening until the second locking means has been released by operation of the second release means.

The parts of the safe box preferably include an inner part nestably received within an outer part, with the limited access opening being in one side of the outer part. The first locking means includes an elongated hollow locking member extending through opposite sides of the inner part, and having inner and outer ends. The inner end of the locking member is releasably secured to the inside surface of one side of the outer member by the first release means. The outer end of the locking member is positioned in the limited access opening. The blocking member is located between walls of the inner and outer members adjacent the outer end of the locking member. The locking member has a transverse slot or opening through which the blocking member extends for blocking access to the first relase means through the hollow locking member.

The safe box is preferably of the type wherein the parts have sidewalls between which a downwardly opening space is defined. A base member having upwardly extending flanges received in this space cooperates with the first locking means for releasably locking the parts of the safe box to the base member.

The safe box may be considered an enclosure having an access member movable between closed and open positions for selectively providing access to the enclosure. First releasable locking means is movable between locking and releasing positions for releasably locking the accesss member in its closed position. The first releasable locking means includes key operated first release means located within the enclosure for releasing the first releasable locking means. A limited access opening in a wall of the enclosure provides limited access to the first release means by a special key. Second releasable locking means having key operated second release means accessible externally of the enclosure includes blocking means selectively movable between blocking and unblocking positions for selectively blocking and unblocking access through the limited access opening to the first release means.

The blocking means on the second locking means preferably engages the first locking means for holding same in its locking position as well as blocking access to the first release means. This arrangement requires release of the second locking means before the first locking means can be released.

The first locking means for the enclosure may include a movable locking member which moves in a predetermined direction between locking and releasing positions. The blocking means on the second locking means moves transversely to the predetermined direction.

The enclosure may comprise an inner open top box having a bottom and a box peripheral wall. The movable access member may comrpise a cover positioned over the open top of the box and having a cover peripheral wall overlying the box peripheral wall. The first locking means then may include an elongated member extending through one side of the cover peripheral wall to releasable securement to the opposite side of the cover peripheral wall by the first release means. The entire enclosure preferably is locked to a base member having flanges extending between the box peripheral wall and the cover peripheral wall.

Accordingly, a primary object of the invention is the provision of a safe box with first and second locking means which cooperate with one another in such a manner that one of the locking means must be released before access can be had to the other locking means.

A further object of the invention is the provision of a safe box having an improved locking arrangement which is very difficult and time consuming to open even by professional thieves.

A still further object is the provision of a safe box with two different locks which cooperate with one another instead of cooperating only with separable parts of the box.

BRIEF DESCRIPTION OF THE DRAWING

The above and other objects and advantages will become apparent from the following description when read in conjunction with the accompanying drawings wherein:

FIG. 1 is a pictorial view of a safe box having the improved locking arrangement of the present invention incorporated therein;

FIG. 2 is a vertical cross-sectional view taken on line 2—2 of FIG. 1;

FIG. 3 is a cross-sectional view taken generally on line 3—3 of FIG. 2;

FIG. 4 is an enlarged cross-sectional view showing cooperation between two different locks; and FIG. 5 is an exploded pictorial view showing the relationship between the members forming the box.

DESCRIPTION OF THE PREFERRED EMBODIMENT

Referring more particularly to the drawing, the preferred embodiment of the invention is shown as being incorporated in an enclosure or safe box 10 formed of separable parts including an outer part 14 nestably receiving an inner part 16. Inner part 16 comprises a generally rectangular open top metal box having a bottom wall 20 and an upstanding peripheral wall 22.

The outer part 14, which may be considered a cover or movable access member for the enclosure, is a generally rectangular metal part shaped similarly to box 16 and having a top wall 28 and a depending peripheral wall 30. Top wall 28 has a narrow slit or a tortuous passage therethrough generally shown at 34 for allowing deposit of money and the like into the box. The deposit opening shown by numeral 34 is shaped and dimensioned in such a manner that the contents of the box cannot be removed through that opening.

The peripheral wall 30 of the outer part 14 has a circular hole 38 through one sidewall thereof aligned with a threaded bore 40 in a metal member 42 welded to the interior surface of the sidewall on outer part 14. A suitable hold through the peripheral wall 30 above the hole 38 has locking means 46 in the form of a conventional lock assembly mounted therein. A suitable nut and lock washer assembly 48 may comprise one way of mounting the lock assembly 46 to the peripheral wall 30. The lock assembly 46 includes what may be considered a release means in the form of the key receiving opening 50 for receiving a conventional key which acts upon tumblers or the like to open the lock. A blocking member 52 on the lock assembly 46 swings in an arcuate path generally parallel to the sidewall in which the lock assembly 46 is mounted.

A base member 56 is adapted to be bolted, riveted, welded or otherwise suitably secured to the floor or frame of a vehicle cab. Where the base member 56 is secured by fasteners such as rivets or bolts, the fasteners are completely covered by the enclosure parts 14 or 16. The base member 56 has spaced-apart upwardly extending flanges 58 with aligned holes 60 therethrough. An open shaft 59 is joined to flanges 58 in alignment with holes 60. As shown, base member 56 also includes transversely extending angle members 61 positioned to support inner part or box 16 so that its bottom wall 20 is above shaft 59.

With reference to FIG. 2, line 62 may represent the floor of a vehicle cab or a reference plane. The holes 38 and 60 in the parts 16 and 56 are all spaced substantially the same distance above the reference plane 62 so they are aligned with one another when the parts are assembled as shown in FIG. 2. Threaded bore 40 is also in alignment with these holes. The inner part 16 is dimensioned to rest on the base member 56 between the flanges 58 and the angle members 61. The outer part or cover 14 is dimensioned to fit over the inner part 16 and the base member 56, with the peripheral walls 22 and 30 spaced from one another to define a downwardly opening space generally indicated by numeral 66 in FIG. 2. The upstanding flanges 58 are received in the space 66.

An elongated hollow locking member 70 extends through the tube 61 and the aligned holes 38 and 60 in the parts 14 and 56. The inner end of the locking member 70 has an inwardly extending flange 72 against which the enlarged head of a bolt 74 acts when the threaded shank of the bolt is firmly threaded into the threaded bore 40. With the inner end of the hollow locking member 70 secured against or to the inner surface of one sidewall on the outer part 14, the outer end of the locking member 70 is positioned in the hole 38 in the opposite sidewall. The locking member 70 extends through all of the holes in all of the parts for preventing access to the interior of the box, and preventing removal of the box from the cab in which the base member 56 is secured. The enlarged head of the bolt 74 has a socket 80 as shown in FIG. 3 which may be a hexagonal or of outer suitable shapes for receiving a correspondingly shaped projection 82 on an elongated tool 84 having a manipulating handle 86. The tool 84 is dimensionsed to extend freely the full length through the interior of the hollow locking member 70 so that the bolt 74 can be rotated in either direction. Attempting to remove the locking member 70 by the use of a pipe extracting tool or the like simply causes some loosening of the bolt 74 so that the locking member 70 would rotate relative to the bolt and could not be removed. Complete removal of the bolt 74 allows longitudinal withdrawal of the locking member 70 from its position shown in FIG. 2 so that the parts can be separated from one another.

The shaft 61 and the elongated locking member 70 each have a transverse opening or slot 90 therein as shown in FIG. 4 to receive the blocking member 52 which blocks the hollow interior of the locking member 70 against entry of the tool 84 therethrough. The blocking member 52 also holds the locking member 70 against the longitudinal movement for retaining means in its locking position.

For purposes of description, the elongated locking member 70 and its associated cooperating parts may be considered a first locking means for releasably locking the part 14 to the base member 56. This first releasable locking means may be considered as having a key operated first release means defined by the bolt 74. This first release means is key operated in the sense that a standard and conventional tool will not work for operating same. For example, where the socket 80 could accept a conventional allen wrench, the distance to the socket 80 from outside the wall 30 is greater than the length of any standard allen wrench which is manufactured and readily available. Therefore, the bolt 74 can be removed only by these persons having a special tool called a key for convenience. The lock assembly 46 may be considered a second locking means having a second release means in the form of the key receiving slot 50 and the tumblers or the like which open the lock. The blocking means 52 is located in its blocking position in FIGS. 2 and 4 wherein it blocks access to the first release means defined by the bolt 74 through the limited access opening 38 and through the hollow interior of the locking member 70. Operation of the second release means moves the blocking member 52 to an unblocking position so it is not received in the slot 90. This allows access to the first release means through the hollow interior of the locking member 70. The blocking member 52 is preferably located between peripheral walls of the outer and inner parts 14 and 16. The locking member 70 is movable along its longitudinal axis in a predetermined direction between locking and unlocking positions, and the blocking member 52 moves transversely of that predetermined direction between its blocking and unblocking positions. When the cover or outer part 14 is considered a movable access member, it is shown in its closed position in FIG. 2. Release of the locking means allows the access member to be lifted to an open position for providing access to the interior of the enclosure and allowing the entire enclosure to be removed from the base member 56. In the preferred arrangement shown, the first release means defined generally by the bolt 74 is located within the enclosure or between the parts 14 and 16, and is accessible only by a tool which extends completely from one side of the enclosure to the other.

The improved safe box of the present application is arranged so that the elongated locking member 70 cannot be reached for sawing or cutting by a thief. Likewise, destruction of the lock 46 will not help in gaining access to the interior of the enclosure if the blocking member 52 is not turned out of its blocking position. Close reception of the blocking member 52 in the slot 90 prevents destruction of the lock assembly 46 and the locking member 52 by insertion of a small rod or the like into the locking member 70 and hammering on same because the force is simply transmitted to the locking member 70. Therefore, the locking member 70 and the blocking member 52 of the lock assembly 46 cooperate with one another to reinforce and strengthen one another, as well as cooperating with one another to make it more difficult to open the box.

The invention has been described in great detail sufficient to enable one of ordinary skill to the art to make and use the same. Obviously, modifications and alterations of the preferred embodiment will occur the others upon the reading and understanding of the specification, and it is out intention to include all such modifications and alterations as part of our invention insofar as they come within the scope of the appended claims.

What is claimed is:

1. An enclosure having an access member movable between closed and open positions for selectively providing access to said enclosure, first releasable locking means movable between locking and releasing positions for releasably locking said access member in said closed position, said first releasable locking means including key operated first release means located within each enclosure for releasing said first releasable locking means, a limited access opening in a wall of said enclosure for providing limited access to said first release means by a key, second releasable locking means having key operated second release means accessible externally of said enclosure and including blocking means selectively movable between blocking and unblocking positions for selectively blocking and unblocking access through said opening to said first release means, said first locking means further including an enlongated hollow member extended through said limited access opening and having inner and outer ends, said first release means being located at said inner end of said hollow member, said hollow member having a transverse opening therein, and said blocking means being movable transversely of said hollow member into and out of said transverse opening in moving respectively between said blocking and unblocking positions.

2. The enclosure of claim 1 including a fixed base member to which said enclosure is immovably secured by said first locking means.

3. The enclosure of claim 1 wherein said enclosure includes an open top box having a bottom and a box peripheral wall, said access member comprising a cover positioned over open top and having a cover peripheral wall overlying said box peripheral wall, and wherein said elongated member extends through one side of said cover peripheral wall to releasable securement to the opposite side of said cover peripheral wall by said first release means.

4. The enclosure of claim 3 including a base member having upstanding flanges extending between said box peripheral wall and said cover peripheral wall, and said elongated member extends through said upstanding flanges.

5. A safe box or the like including separable parts releasably locked together by first and second locking means respectively having first and second key operated release means, said first release means being located between said parts for access through a limited access opening in one of said parts, and said second locking means including a blocking member which holds said first locking member against release and prevents access to said first release means through said limited access opening until said second locking means have been released by operation of said second release means, said separable parts further comprising an inner part hestably received within an outer part and said limited access opening is in one side of said outer part, said first locking means including an elongated hollow locking member extending through opposite sides of said inner part and having inner and outer ends, said inner end being removably secured to the inside surface of one side of said outer member by said first release means, said outer end being positioned in said limited access opening, said blocking member being located between walls of said inner and outer members adjacent said outer end, and said locking member having a transverse opening through which said blocking member extends.

6. The safe box of claim 5 wherein said separable parts include sidewalls between which a downwardly opening space is defined, a base member having upwardly extending flanges received in said space, and said first locking means cooperating with said flanges to releasably lock said outer part to said base member.

* * * * *